United States Patent [19]

Clarke et al.

[11] Patent Number: 5,391,955

[45] Date of Patent: Feb. 21, 1995

[54] ELECTRIC MOTOR WITH BRUSH SPRING RETENTION MEANS

[75] Inventors: Michael T. Clarke, Lake Odessa; Dennis G. Reid, Lansing, both of Mich.

[73] Assignee: Eaton Stamping Company, Eaton Rapids, Mich.

[21] Appl. No.: 144,691

[22] Filed: Oct. 29, 1993

[51] Int. Cl.⁶ .................... H02K 13/00; H02K 5/14
[52] U.S. Cl. ................................ 310/242; 310/245; 310/247
[58] Field of Search ............... 310/238, 239, 242, 245, 310/247

[56] References Cited

U.S. PATENT DOCUMENTS

| | | | |
|---|---|---|---|
| 1,948,268 | 2/1934 | Kitto | 310/247 |
| 2,870,354 | 1/1959 | Antonidis et al. | 310/447 |
| 3,480,814 | 11/1969 | Amrein | 310/247 |
| 3,510,708 | 5/1970 | O'Connor, III | 310/242 |
| 3,710,160 | 1/1973 | Voglesonger | 310/247 |
| 3,745,393 | 7/1973 | Spors | 310/247 |
| 3,784,856 | 1/1974 | Preston | 310/239 |
| 3,911,304 | 10/1975 | Seely | 310/242 |
| 3,955,113 | 5/1976 | Hillyer et al. | 310/245 |
| 4,056,749 | 11/1977 | Carlson, Jr. et al. | 310/239 |
| 4,074,162 | 2/1978 | Parzych | 310/245 |
| 4,266,155 | 5/1981 | Niemela | 310/239 |
| 4,354,128 | 10/1982 | Chew et al. | 310/242 |

FOREIGN PATENT DOCUMENTS

| | | | |
|---|---|---|---|
| 233738 | 6/1910 | Germany | 310/247 |
| 2712721 | 9/1978 | Germany | 310/242 |
| 1763883 | 9/1979 | Germany | 310/239 |
| 166461 | 12/1980 | Japan | 310/9 |
| 366228 | 2/1932 | United Kingdom | 310/239 |

*Primary Examiner*—R. Skudy
*Assistant Examiner*—Clayton E. LaBalle
*Attorney, Agent, or Firm*—Lorusso & Loud

[57] ABSTRACT

There is presented an electric motor having a drive shaft, an armature and a commutator fixed on the drive shaft, a housing disposed around the armature, magnets disposed between the armature and the housing, and an endframe fixed to the housing. The endframe has therein a journal for retaining the drive shaft, brushes for contact with the commutator, and shunts and terminals connected to the brushes. In the endframe are brush tubes for slidably retaining the brushes and coil springs for urging the brushes into engagement with the commutator. Each brush tube has one of the coil springs therein, an outer end, side, front and rear walls sufficiently closed to prevent egress of the coil spring, and an open inner end through which one of the brushes engages the commutator. An internal wall of the brush tube is provided with a barb integral therewith and extending inwardly of the brush tubes to overlie a portion of the coil spring proximate the brush tube outer end. The barb is configured to permit passage of the coil spring toward the tube outer end, but prevent passage of the spring toward the tube open end, thereby to prevent egress of the spring through the tube open end.

1 Claim, 5 Drawing Sheets

ELECTRIC MOTOR WITH BRUSH SPRING RETENTION MEANS

BACKGROUND OF THE INVENTION

1. Field of the Invention

The invention relates to electric motors and is directed more particularly to an electric motor having brush tubes fixed in an endframe portion of the motor.

2. Description of the Prior Art

In electric motors, brushes are commonly retained in brush tubes which usually are molded integrally with a plastic endframe portion of the motor. The endframe and brush tubes typically are of a plastic material. The brush tubes are square in cross-section and hollow, somewhat like elevator shafts, in which spring-biased brushes are slidably moveable into engagement with the commutator of the motor.

In assembly of such motors, it is common that a coil spring is inserted in a brush tube and, thereafter, a brush, with a shunt attached thereto, is inserted in the brush tube on top of the spring. In shipment and handling prior to assembly, it is sometimes the case that the brush and spring fall out of the open end of the tube. At the final assembly point, it is on occasion overlooked that the spring is missing. It is usually apparent when the brush is missing, but sometimes the brush is replaced without the absence of the spring having been noticed. In some instances, the shunt may, for a limited time, exercise spring-like properties and hold the brush in a commutator-engaging position. However, the shunt usually cannot maintain its spring-like performance and, in due course, the brush falls away from commutator engagement, terminating proper operation of the motor.

Accordingly, there exists a need for a motor having brush spring retention means.

SUMMARY OF THE INVENTION

It is, therefore, an object of the invention to provide an electric motor having an endframe and brush tube arrangement, wherein the brush tubes are provided with means for retaining the coil springs therein while permitting the coil springs to flex as needed to urge their respective brushes into engagement with a commutator.

With the above and other objects in view, as will hereinafter appear, a feature of the present invention is the provision of an electric motor comprising a drive shaft, an armature and commutator assembly fixed on the drive shaft, a housing disposed around the armature and commutator assembly, magnet means disposed between the armature and commutator assembly and the housing, and an endframe fixed to the housing. The endframe has therein means for retaining the drive shaft, brush means in contact with a commutator portion of the armature and commutator assembly, shunt and terminal means connected to the brush means, and brush tubes for slidably retaining the brush means, and for retaining a coil spring for urging the brush means into engagement with the commutator portion of the armature and commutator assembly. Each of the brush tubes retains one of the coil springs therein, and is provided with an outer end, side, front and rear walls sufficiently closed to prevent egress of the coil spring means, and an open inner end through which one of the brush means slidably engages the commutator portion. At least one of the side, front and rear walls of the brush tube is provided with an integral barb extending inwardly of the brush tube to overlie a portion of the coil spring proximate the brush tube closed end. The barb is configured to permit passage of the coil spring toward the brush tube closed end, but prevent passage of the coil spring toward the brush tube open inner end, thereby to prevent egress of the coil spring through the brush tube inner end.

In accordance with a further feature of the invention, there is provided a brush tube for an electric motor, the brush tube being configured to slidably retain a brush, and to retain a coil spring for urging the brush into engagement with a commutator of the motor, the brush tube comprising an outer end wall sufficiently closed to prevent egress of the spring therethrough, side, front and rear walls sufficiently closed to prevent egress of the spring therethrough, and an open inner end through which the brush may protrude to engage the motor commutator. The brush tube further comprises a barb integral with at least one of the side, front and rear walls and extending inwardly of the brush tube to overlie a portion of the coil spring proximate the brush tube closed end. The barb is configured to permit passage of the coil spring toward the brush tube closed end, but prevent passage of the coil spring towards the brush tube open inner end, to prevent egress of the coil spring through the brush tube inner end.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
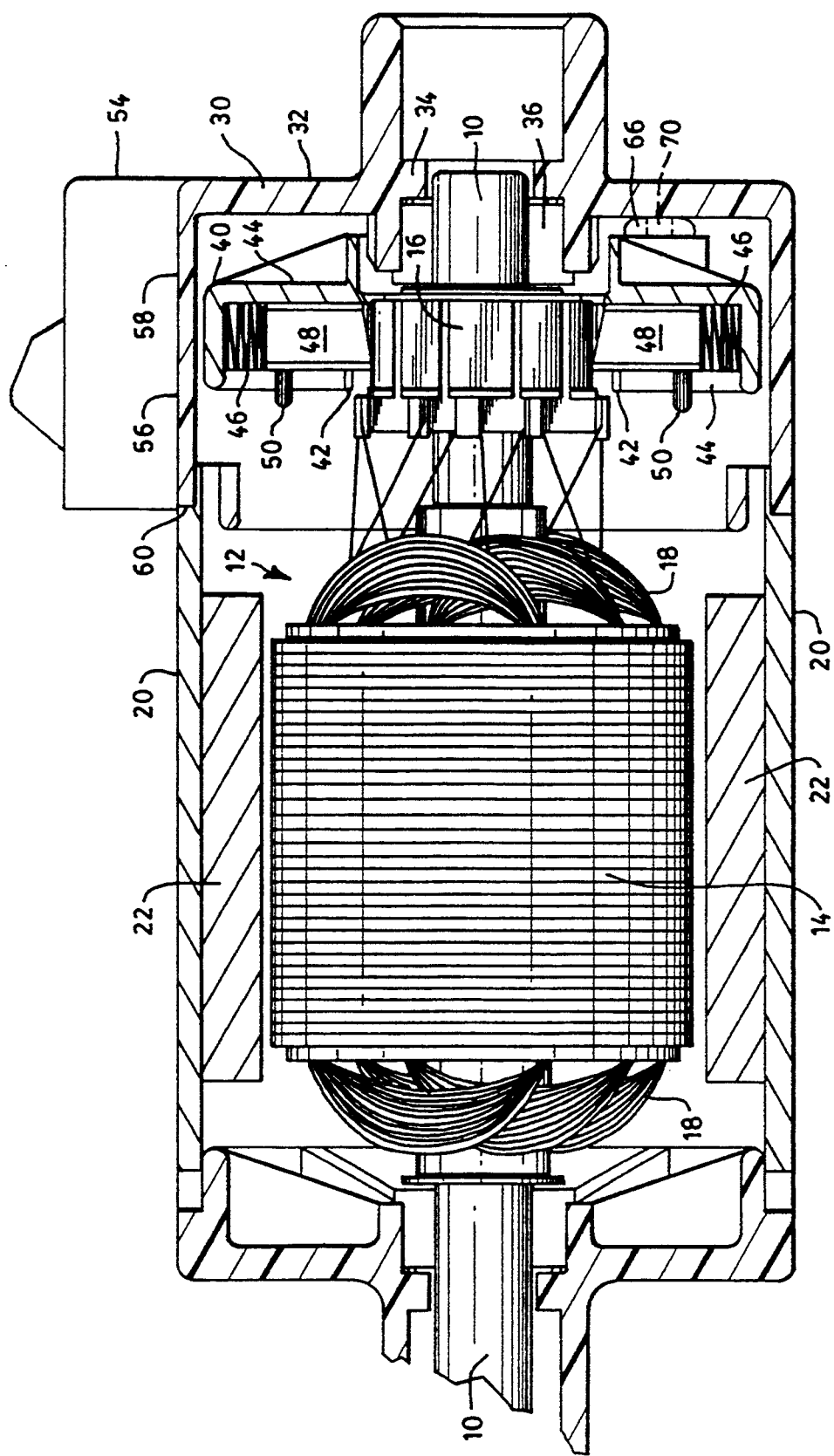
FIG. 1 is a partly side elevational, partly sectional, view of one form of motor illustrative of an embodiment of the invention.

Referring to FIG. 1, it will be seen that the illustrative motor includes a drive shaft 10. Fixed to the drive shaft 10 is an armature and commutator assembly 12, including an armature 14, a commutator 16, and appropriate windings 18.

A metal housing shell 20, preferably of steel, is disposed around the armature 14. Permanent magnets 22 are disposed between the housing shell 20 and the armature 14 and are secured to the housing shell.

An endframe 30, of plastic material, is fixed to the housing shell 20. The endframe 30 has formed in a substantially closed end 32 a journal 34 for retaining a bearing 36 which, in turn, supports the drive shaft 10.

Figure 2:
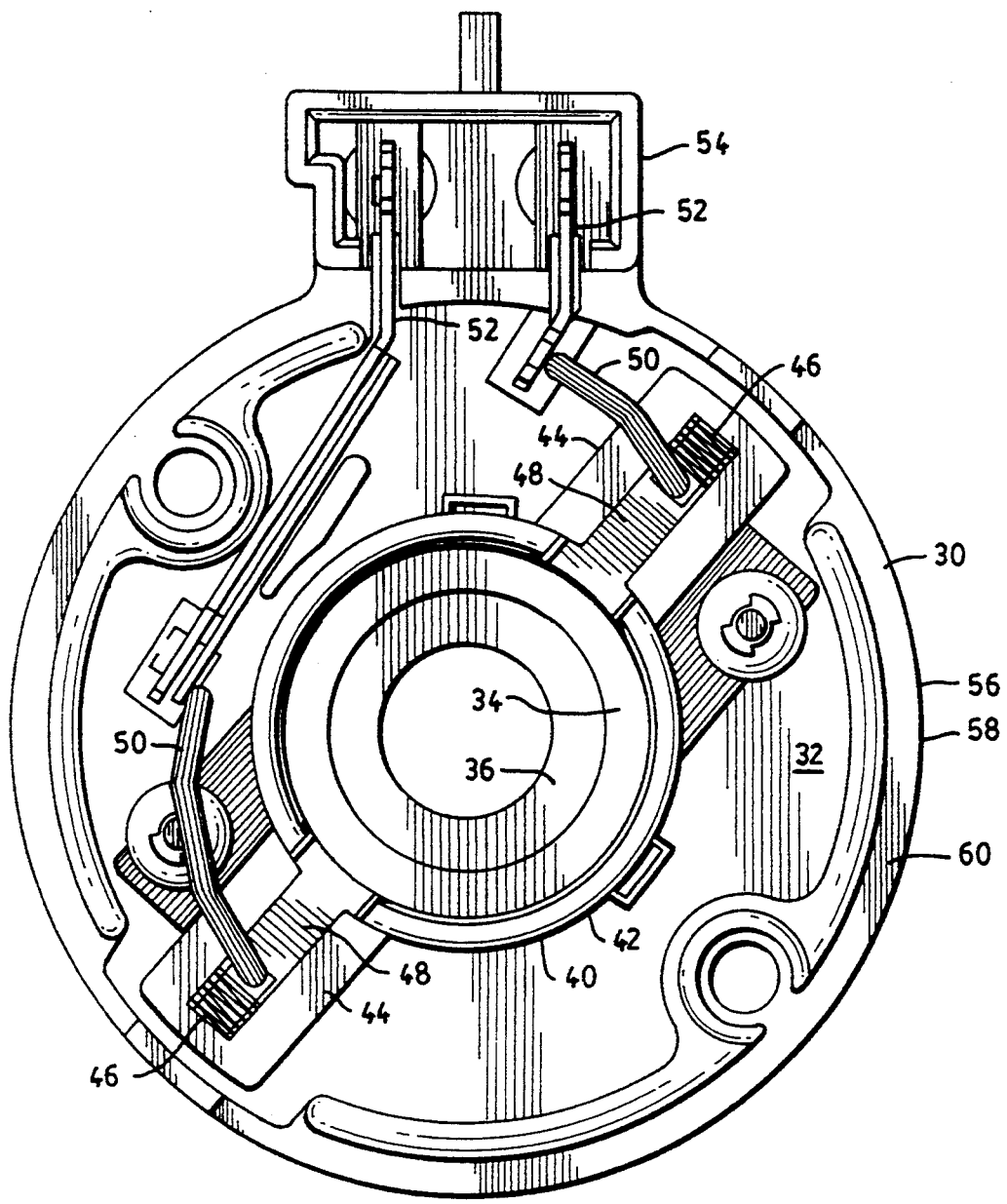
FIG. 2 is an end view of an endframe portion of the motor shown in FIG. 1, taken from the open end of the endframe.
Figure 4:
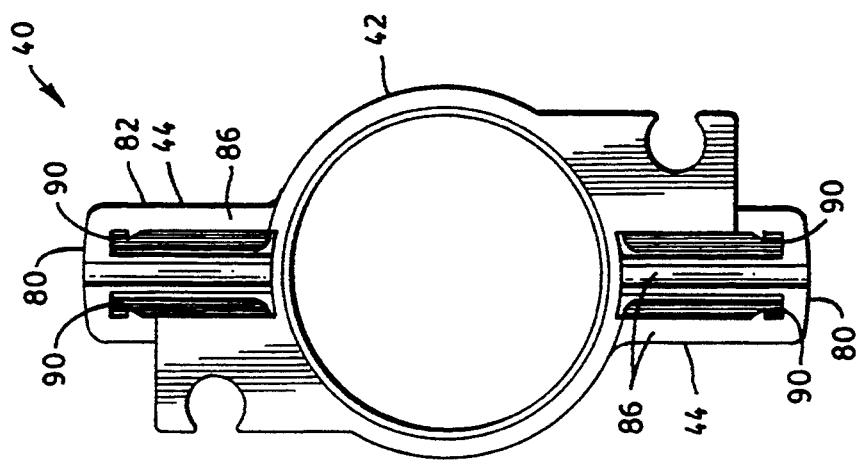
FIG. 4 is a rear elevational view of the brush tube assembly 8 of FIG. 3.
Figure 3:
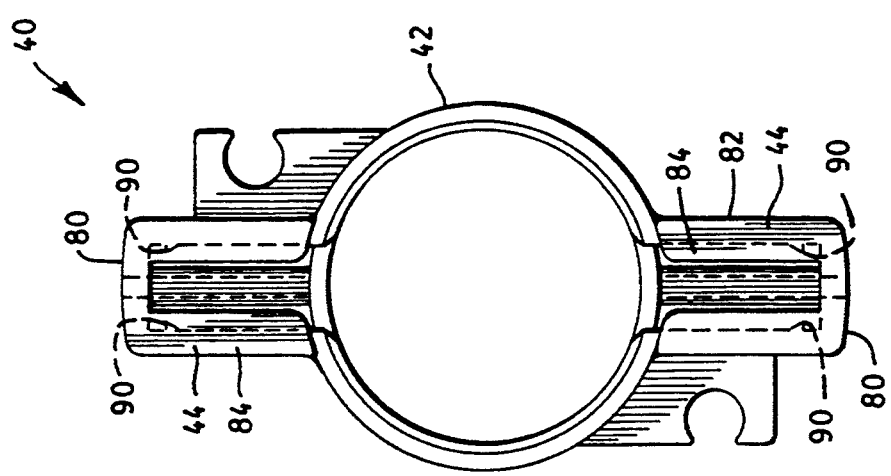
FIG. 3 is a front elevational view of an illustrative brush tube assembly.
Figure 6:
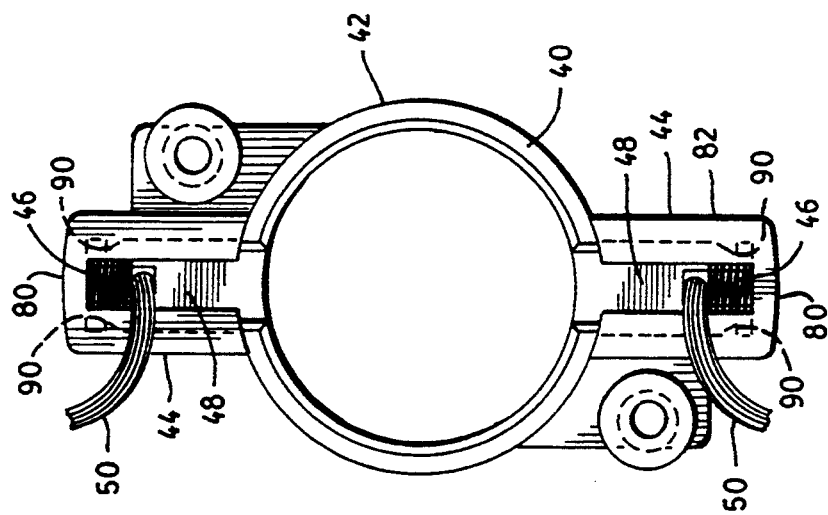
FIG. 6 is similar to FIG. 3, but shows the brush tube assembly with brushes and brush springs in place.

Disposed in the endframe 30 is a brush tube assembly 40 (FIGS. 1 and 2) which comprises a cylindrically-shaped central portion 42 configured to retain the commutator 16. Extending radially from the central portion 42 are opposed brush tubes 44 (FIGS. 2-5). The central portion 42 and the brush tubes 44 are of plastic and may be formed integrally with each other. Each of the brush tubes 44 has disposed therein a coil spring 46 and a brush 48 (FIG. 2), the spring 46 biasing the brush 48 into engagement with the commutator 16 in the brush tube assembly central portion 42. Each brush 48 has attached thereto a conductive wire lead, or shunt 50, the other end of which is connected to a terminal 52 fixed in a terminal housing portion 54 (FIG. 2).

As may be seen in FIGS. 3-6, the brush tube assembly 40 may be a discrete member which is mounted in the endframe 30. Alternatively, the brush tube assembly may be molded integrally with the endframe.

Figure 5:
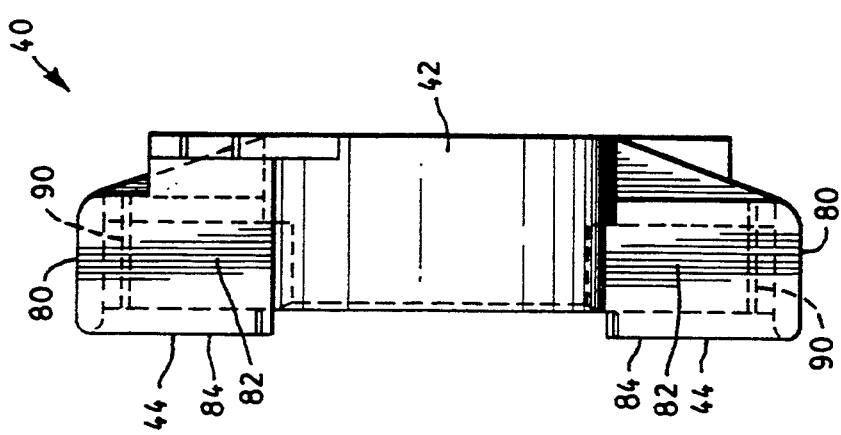
FIG. 5 is a side elevational view of the brush tube assembly of FIGS. 3 and 4.
Figure 7:
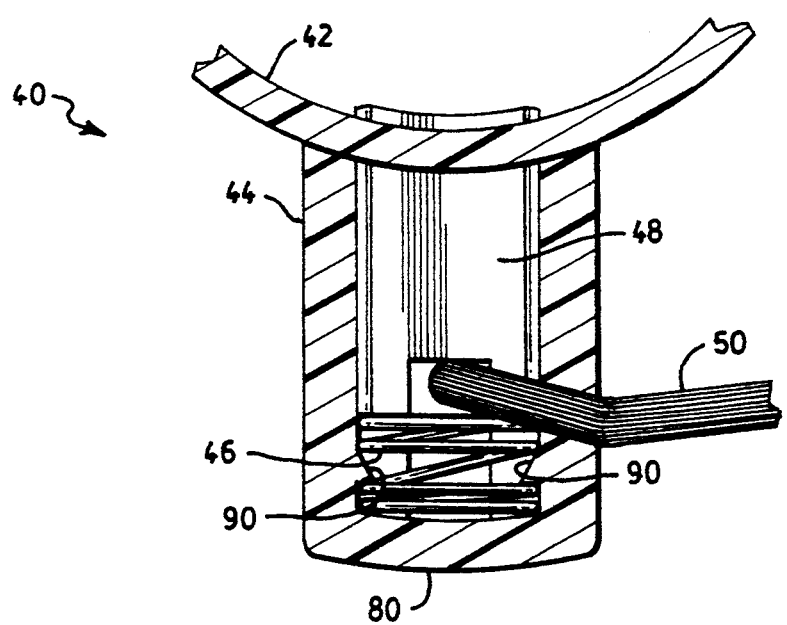
FIG. 7 is an enlarged sectional view of a brush tube assembly, showing means for retaining an end of the brush spring in place.

Referring to FIGS. 3-7, it will be seen that each brush tube 44 is provided with a closed outer end 80, and closed side walls 82 (FIG. 5). Front and rear walls 84, 86 (FIGS. 3 and 4) are sufficiently closed to prevent egress of the coil spring 46 therethrough. Though the outer end 80 and side walls 82 are shown as completely closed, it is necessary only that they be sufficiently closed to prevent movement of the spring therethrough. At least one wall, and preferably opposed walls, as for example, the side walls 82, are provided with barbs 90 integral therewith and extending inwardly of the brush tube 44 to overlie a portion of the coil spring 46 proximate the brush tube closed end 80. As may be seen in FIGS. 5 and 7, the barbs 90, which extend substantially across the width of the opposed walls 82, are adapted, in cooperation with the brush tube outer end 80, to retain at least one coil of the spring 46 between the barbs 90 and the tube outer end 80, to securely anchor an end of the spring 46 at the outer end 80 of the tube 40. The barb is configured (FIG. 7) to permit passage of the coil spring toward the brush tube closed end 80, but prevent passage of the coil spring toward the brush tube open end. Thus, in assembly, the spring 46 easily may be inserted into the brush tube 44, readily override the barb 90, and snap thereunder, to anchor the spring in the brush tube.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A brush tube for an electric motor, said brush tube being configured to slidably retain a brush, and to retain a coil spring for urging said brush into engagement with a commutator of said motor, said brush tube comprising:

an outer end wall sufficiently closed to prevent egress of said spring therethrough, side, front and rear walls sufficiently closed to prevent egress of said spring therethrough, an open inner end through which said brush may protrude to engage said motor commutator, and first and second opposed barbs disposed, respectively, on opposite of said side, front and rear walls and extending inwardly of said brush tube toward one another to overlie two opposite portions of said coil spring proximate said brush tube outer end wall, said barbs extending substantially across the widths of said walls, said barbs and said outer end wall being adapted to retain therebetween at least one coil of said spring, said barbs being configured to permit passage of said coil spring toward said brush tube outer end wall, but prevent passage of said coil spring towards said brush tube open end, to prevent egress of said coil spring through said brush tube open end.

* * * * *